(12) United States Patent  (10) Patent No.: US 9,114,590 B2
Onodera  (45) Date of Patent: Aug. 25, 2015

(54) FOAM DUCT

(71) Applicant: KYORAKU CO., LTD., Kyoto (JP)

(72) Inventor: Masaaki Onodera, Kanagawa (JP)

(73) Assignee: KYORAKU CO., LTD., Kyoto (JP)

( * ) Notice: Subject to any disclaimer, the term of this patent is extended or adjusted under 35 U.S.C. 154(b) by 55 days.

(21) Appl. No.: 13/761,275

(22) Filed: Feb. 7, 2013

(65) Prior Publication Data

US 2013/0224415 A1    Aug. 29, 2013

(30) Foreign Application Priority Data

Feb. 28, 2012 (JP) .................... 2012-042295

(51) Int. Cl.
*B29D 22/00* (2006.01)
*B32B 1/08* (2006.01)
*B29C 44/04* (2006.01)
*B29L 31/26* (2006.01)
*B29L 23/00* (2006.01)

(52) U.S. Cl.
CPC . *B32B 1/08* (2013.01); *B29C 44/04* (2013.01); *B29L 2023/22* (2013.01); *B29L 2031/26* (2013.01); *Y10T 428/1376* (2015.01)

(58) Field of Classification Search
CPC ... B32B 1/08; B29L 2031/26; B29L 2023/22; B29C 44/04; F16L 9/003; F16L 59/14; Y10S 138/09; Y10S 138/11

USPC ................... 428/36.5; 138/140, 137
See application file for complete search history.

(56) References Cited

U.S. PATENT DOCUMENTS

| 5,176,866 | A | * | 1/1993 | Tanaka et al. | 264/219 |
| 5,971,034 | A | * | 10/1999 | Heisey et al. | 138/149 |
| 6,283,159 | B1 | * | 9/2001 | Tada | 138/116 |
| 2013/0224415 | A1 | * | 8/2013 | Onodera | 428/36.5 |
| 2013/0323448 | A1 | * | 12/2013 | Onodera et al. | 428/36.5 |

FOREIGN PATENT DOCUMENTS

JP  2011-116120  6/2011
JP  2011-194700  10/2011

OTHER PUBLICATIONS

U.S. Appl. No. 13/761,262 to Masaaki Onodera, filed Feb. 7, 2013.

* cited by examiner

*Primary Examiner* — James Yager
(74) *Attorney, Agent, or Firm* — Greenblum & Bernstein, P.L.C.

(57) ABSTRACT

A foam duct to which a heat insulating property and a shock absorbing property can be is provided due to structure of the foam duct is a foam duct including foam resin and includes a high-foam wall portion having a higher expansion ratio than other wall portions.

6 Claims, 16 Drawing Sheets

X-X' CROSS SECTION (a)

(b)

X-X' CROSS SECTION (a)

(b)

(a)

(b)

(a)

(b)

(c)

A-A' CROSS SECTION (a)

(b)

// FOAM DUCT

BACKGROUND

1. Technical Field

The present invention relates to a foam duct including foam resin.

2. Related Art

As the duct for vehicles such as cars, a foam duct including foam resin is employed. The foam duct is less heavy than a duct including non-foam resin and is hence suitable for vehicles the weight of which is desired to be reduced from a viewpoint of fuel efficiency and the like.

The foam duct of this kind is ordinarily produced in the following molding method. First, a foam resin prepared by melting and kneading various materials is extruded from an annular die of an extruding machine to form a cylindrical foam parison. The foam parison is clamped by a metallic mold and then air is blown into the foam parison in the metallic mold to push the foam parison against a cavity of the metallic mold to thereby shape the foam parison. The foam parison is then extended to be molded in a contour of the cavity. Thereafter, the molded item having the cavity contour is cooled. The mold is then opened. The molded item is removed and undesired portions thereof are removed, to thereby obtain a desired foam duct.

Document for the foam duct includes, for example, Patent Document 1 (Japanese Patent Laid-Open Ser. No. 2011-194700) and Patent Document 2 (Japanese Patent Laid-Open Ser. No. 2011-116120).

According to Patent Document 1, it is possible, by defining each material of the foam resin, to mold a lightweight foam duct having a sufficient property against low-temperature shock by using less expensive material composition and by decreasing the kinds of mixing materials.

According to Patent Document 2, it is possible, by defining polypropylene-based resins constituting the foam resin, to mold a foam duct with a high expansion ratio in which pinholes are not easily formed even with a high blow ratio.

PATENT DOCUMENT

Patent Document 1: Japanese Patent Laid-Open Ser. No. 2011-194700

Patent Document 2: Japanese Patent Laid-Open Ser. No. 2011-116120

SUMMARY OF THE INVENTION

In the molding method described above, the foam duct is molded as below. A foam parison is pushed against cavities of a metallic mold to shape the foam parison, and then the foam parison is extended along contours of the cavities. Hence, the extended portion becomes thinner, to form a thin portion in the foam duct depending on cases. When such thin portion is formed, sufficient heat insulation is not obtained and condensation takes place in the thin portion. This leads to a problem, that is, it is not possible to fully remove the condensation preventive member to avoid drops of condensed water. There also exists a problem in which when the foam duct falls on, for example, a floor or collides with another member, the thin portion is easily broken.

It is hence required to remove these problems by providing the foam duct with a heat insulating property and a shock absorbing property.

In this connection, Patent Document 1 and Patent Document 2 describe techniques to obtain a desired foam duct by defining each material of the foam duct. However, no reference has been made to the structure of the foam duct.

It is therefore an object of the present invention, which has been made in consideration of the situation above, to provide a foam duct in which it is possible, due to structure of the foam duct, to provide the foam duct with a heat insulating property and a shock absorbing property.

To achieve the object, the present invention has an aspect as follows.

The foam duct in accordance with the present invention is a foam duct including foam resin and includes a high-foam wall portion having a higher expansion ratio than other wall portions.

In accordance with the present invention, it is possible, due to structure of the foam duct, to provide the foam duct with a heat insulating property and a shock absorbing property.

DESCRIPTION OF THE EMBODIMENTS

<Outline of Foam Duct 200>

Figure 1:
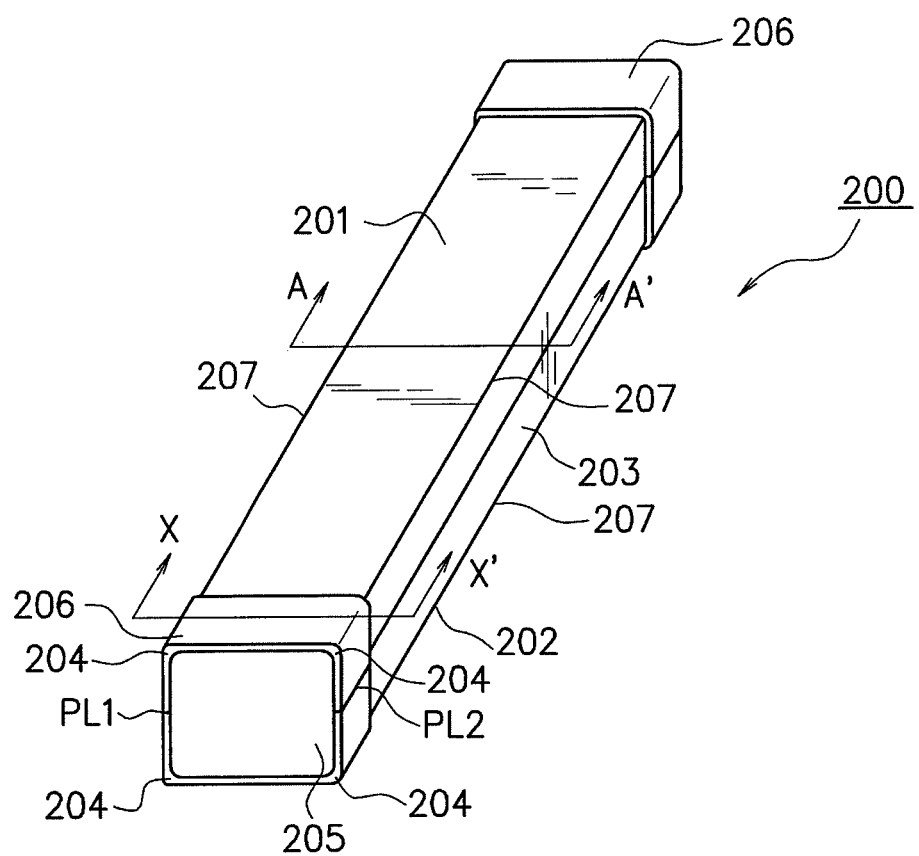
FIG. 1 is a diagram showing a configuration example of a foam duct 200 in a first embodiment.

First, referring to FIGS. 1 and 2, description will be given of an outline of the foam duct 200 of the present embodying mode.

The foam duct 200 of the present embodying mode is a foam duct 200 including foam resin. As FIG. 2 shows, the foam duct 200 has an aspect in which the foam duct 200 includes a high-foam wall portion 204 having a higher expansion ratio than other wall portions.

Since the foam duct 200 includes the high-foam wall portion 204 having a high expansion ratio, it is possible, due to structure of the foam duct 200, to provide the foam duct with a heat insulating property and a shock absorbing property. As FIG. 2 shows, since the foam duct 200 includes bent positions (bent portions 207), it is favorable that the bent portions 207 include the high-foam wall portion 204.

The bent portion 207 is a portion formed by extending resin when the foam duct 200 is molded. Hence, ordinarily, the bent portion likely includes a thin portion. When the bent portion 207 includes a thin portion, it is not possible to obtain a sufficient heat insulating property, and condensation occurs in the portion. Further, when the foam duct 200 falls on, for example, a floor or collides with another member, the thin portion is easily broken.

In contrast, in the foam duct 200 of the present embodying mode, since the bent portion 207 includes the high-foam wall portion 204, it is possible to obtain a higher expansion ratio in the bent portion 207 than in other wall portions. It is also possible, without forming a thin portion in the bent portion 207, to increase thickness of the bent portion 207. As a result, occurrence of condensation is prevented in the bent portion 207. Although the bent portion 207 is easily broken when the foam duct 200 falls on, for example, a floor or collides with another member, since the bent portion 207 includes the high-foam wall portion 204, it is possible to provide the bent portion 207 with a shock absorbing property. Hence, it is possible to mitigate the shock taking place when the foam duct 200 falls on, for example, a floor or collides with another member. Referring now to the accompanying drawings, description will be given in detail of the foam duct 200 of the present embodying mode.

(First Embodiment)

<Configuration Example of Foam Duct 200>

Figure 2:
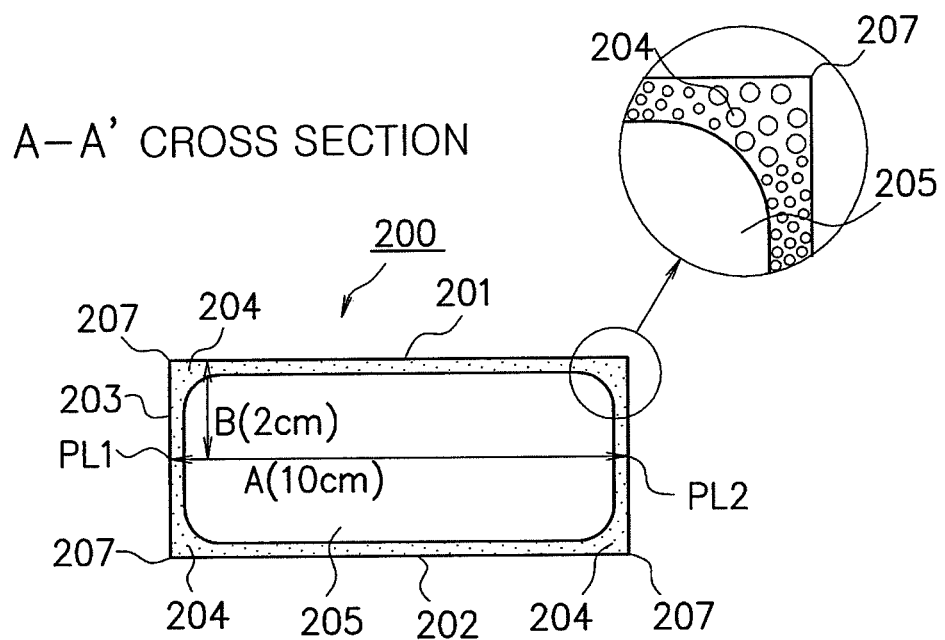
FIG. 2 is a diagram showing an example of an A-A' cross-sectional configuration perpendicular to the hollow extending direction of the foam duct 200 shown in FIG. 1.
Figure 3:
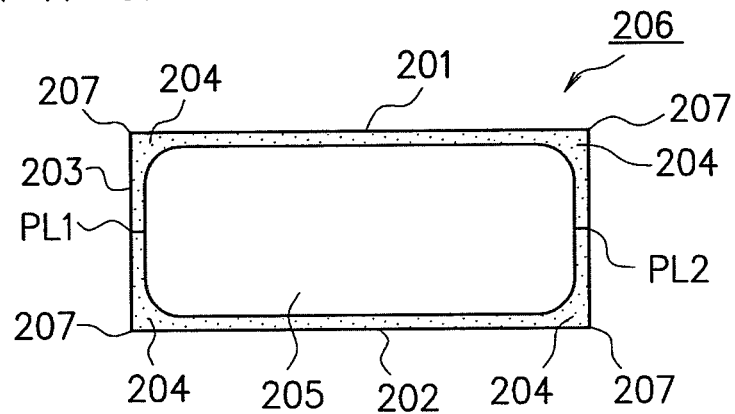
FIG. 3 is a diagram showing an example of an X-X' cross-sectional configuration perpendicular to the hollow extending direction of a connecting portion 206 of the foam duct 200.
Figure 4:
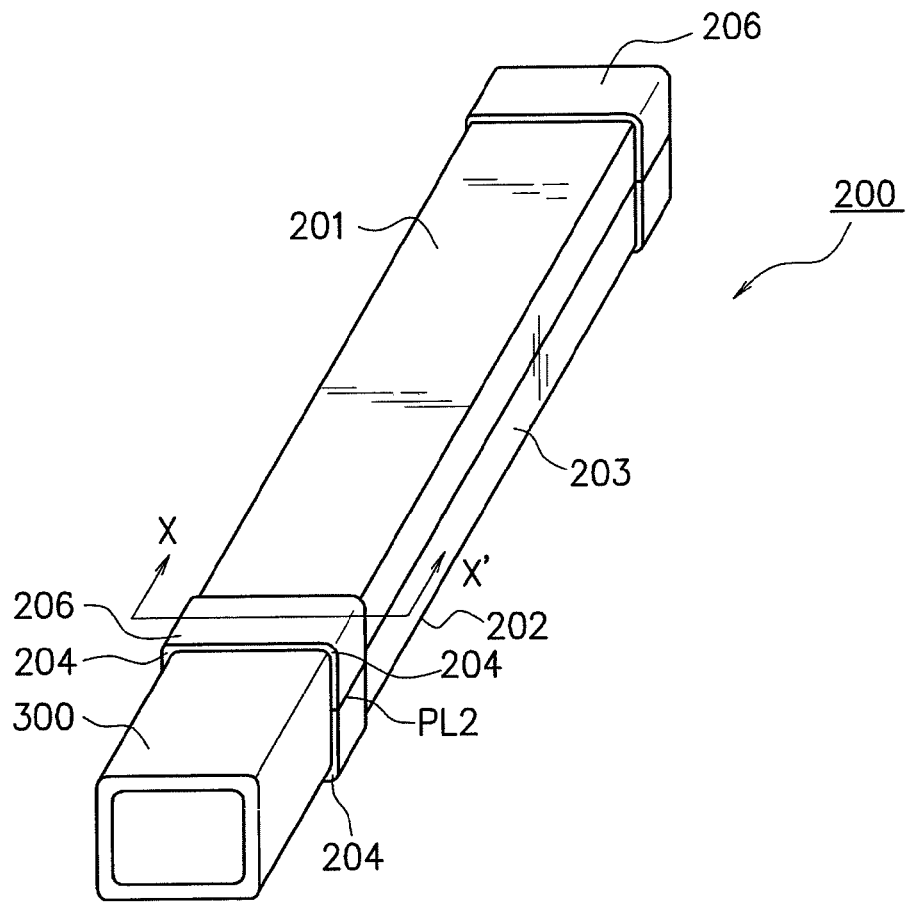
FIG. 4 is a diagram showing a state in which another member 300 is connected to the connecting portion 206 of the foam duct 200.
Figure 5:
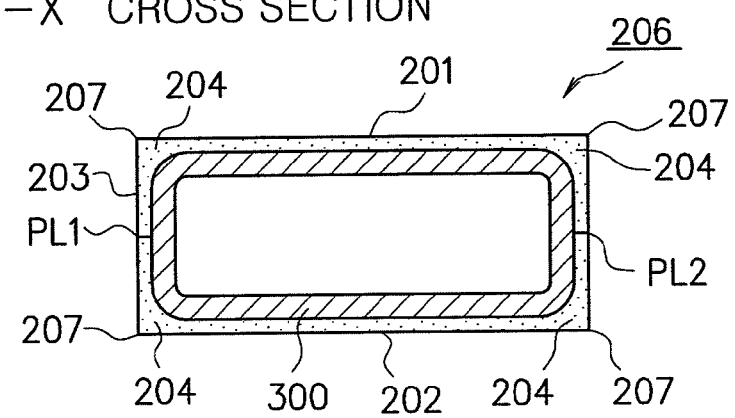
FIG. 5 is a diagram showing an example of an X-X' cross-sectional configuration perpendicular to the hollow extending direction of the connecting portion 206 shown in FIG. 4.

Referring to FIGS. 1 to 5, description will be given of a configuration example of the foam duct 200 of the present embodying mode. FIG. 1 shows a configuration example of the foam duct 200. FIG. 2 is an example of an A-A' cross-sectional configuration perpendicular to the hollow extending direction of the foam duct 200. FIG. 3 shows an example of an X-X' cross-sectional configuration perpendicular to the hollow extending direction of the connecting portion 206 shown in FIG. 1. FIG. 4 shows a state in which another member 300 is connected to the connecting portion 206 of the foam duct 200. FIG. 5 shows an example of an X-X' cross-sectional configuration perpendicular to the hollow extending direction of the connecting portion 206 shown in FIG. 4.

The foam duct 200 is molded by blowing foam resin with an expansion ratio of 2.0 or more in independent bubble structure including a plurality of foamed cells. The expansion ratio is calculated as below. In a portion where the foam duct 200 has a straight-line contour, a test sample (2 cm×2 cm×2 cm) is cut out, to measure the specific gravity thereof by use of an electronic hydrometer EW-200SG (Alpha Mirage) according to JIS K-7112. The expansion ratio is calculated by dividing the specific gravity of the foam duct 200 before foaming by that measured as above.

As FIGS. 1 and 2 show, the foam duct 200 includes a first wall portion 201, a second wall portion 202 opposing the first wall portion 201 with a gap therebetween, and a peripheral wall 203 connecting circumferences of the first and second wall portions 201 and 202 to each other, and a hollow portion 205 in a duct inner surface. In the peripheral wall 203, parting lines PL1 and PL2 are formed.

The foam duct 200 includes the bent portions 207 as shown in FIGS. 1 and 2 and the bent portions 207 include high-foam wall portions 204. The bent portions 207 are portions to be bent in the foam duct 200. The high-foam wall portions 204 have a larger bubble diameter than other wall portions and have a higher expansion ratio than other wall portions. The expansion ratio of the high-foam wall portions 204 is obtained by multiplying that of the other portions by a value ranging from about 0.3 to about 0.5. The expansion ratio of the high-foam wall portions 204 is also calculated in almost the same way as for the straight-line contour portion described above. For example, in the bent portion 207, a test sample (2 cm×2 cm×2 cm) is cut out, to measure the specific gravity thereof by use of an electronic hydrometer EW-200SG (ALPHA MIRAGE) according to JIS K-7112. The expansion ratio is calculated by dividing the specific gravity of the foam duct 200 before foaming by that measured as above. Further, the bubble diameter is calculated as below. For the bubble diameter of the wall portion in the straight contour portion of the foam duct 200, the foam duct 200 is cut off in a direction perpendicular to the channel direction of the foam duct 200 (e.g., along the A-A' crosssection shown in FIG. 2). The cross-sectional surface of the wall portion in the straight contour portion of the foam duct 200 is shot by a Charged Coupled Device (CCD) camera (KEYENCE VH-6300). Diameters of bubbles are measured in a 2 mm² region of the cross-sectional surface, to calculate a mean value of measured values of the diameters of the bubbles. The mean value is used as the bubble diameter of the wall portion in the straight-line contour portion of the foam duct 200. In this situation, the diameter of each bubble is a mean value of the axis length (major axis) in the longitudinal direction of the bubble and the axis length (minor axis) in the vertical direction of the bubble. For the bubble diameter of the high-foam wall portion 204, the foam duct 200 is cut off in a direction perpendicular to the channel direction of the foam duct 200 (e.g., along the A-A' crosssection shown in FIG. 2). The cross-sectional surface of the portion of the bent portion 207 is shot by a Charged Coupled Device (CCD) camera (KEYENCE VH-6300). Diameters of bubbles are measured in a 5 mm² region of the cross-sectional surface, to calculate a mean value of measured values of the diameters of the bubbles. The mean value is used as the bubble diameter of the high-form wall portion 204. In this situation, the diameter of each bubble is a mean value of the axis length (major axis) in the longitudinal direction of the bubble and the axis length (minor axis) in the vertical direction of the bubble. In the present embodying mode, the bubble diameter of the wall portion in the straight-line contour portion of the foam duct 200 is about 200 micrometers (μm) and ranges from 80 μm to 500 μm. The bubble diameter of the high-foam wall portion 204 is about 1.0 millimeter (mm) and is more than 500 μm.

The first and second wall portions 201 and 202 of the foam duct 200 have a mean thickness ranging from 2.0 mm to 3.0 mm. The mean thickness is calculated as below. First, in crosssections at three positions including the center and the first and second ends (upper and lower ends) of the foam duct 200, measurement is conducted by use of a pair of slide calipers to obtain thickness of each portion at six positions in total at which a perpendicular bisector of a straight line between two mold splitting points intersects the first and second wall portions 201 and 202. The mean value of the six measured values thus obtained is employed as the mean thickness.

In the cross-sectional contour perpendicular to the hollow extending direction of the foam duct 200 shown in FIG. 2, wall thickness takes the maximum value in the bent portion 207 including the high-form wall portion 204. Hence, the thickness of the bent portion 207 is larger than the mean thickness of the foam duct 200. To increase the difference in thickness for the foam duct 200, the blow ratio is 0.2 or more and is favorably 0.4 or more. As FIG. 2 shows, the blow ratio of the foam duct 200 is a ratio (B/A), taken in the crosssection perpendicular to the hollow extending direction, between length A of a straight line connecting parting lines PL1 and PL2 to each other and distance B from straight line A to an outer surface of the wall portion most apart therefrom as shown in FIG. 2. The blow ratio is 0.2 in FIG. 2.

The foam resin for the foam duct 200 includes a resin prepared by adding a foaming agent to resin including materials at a predetermined ratio to have MT ranging from 3 cN to 5 cN at 230° C. Such resin including materials to have MT ranging from 3 cN to 5 cN at 230° C. includes materials at the ratio of, for example, BOLEARIS WB140:NIPPON POLYPRO FB3312:Sumitomo Chemical FX201=70:20:10. As the foaming agent, there may be used, for example, inorganic physical foaming agents such as air, carbon dioxide, nitrogen dioxide, and water; organic physical foaming agents such as butane, pentane, hexane, dichloromethane, and dichloroethane; and chemical foaming agents such as sodium bicarbonate, citric acid, sodium citrate, and azodicarbonamide. Further, for these physical and chemical foaming agents, it is also possible to employ a physical foaming agent in combination with a chemical foaming agent. Since the foAm duct 200 is molded by use of a foam resin prepared by adding a foaming agent to resin including materials to have MT ranging from 3 cN to 5 cN at 230° C., it is possible to form, in the bent portion 207, the high-foam wall portion 204 having a high expansion ratio as shown in FIG. 2.

Since the foam duct 200 of the present embodying mode includes the bent portion 207 including the high-foam wall portion 204, it is possible that the bent portion 207 is higher in the heat insulating property and the shock absorbing property than the other wall portions. As a result, condensation is prevented in the bent portion 207. The bent portion 207 is easily broken when the foam duct 200 falls on, for example, a floor or collides with another member. However, since the bent portion 207 includes the high-foam wall portion 204 to provide the shock absorbing property, it is possible to mitigate the shock taking place when the foam duct 200 falls on, for example, a floor or collides with another member. As FIG. 2 shows, in the high-foam wall portion 204, the inside contour differs in the curve from the outside contour. Specifically, the inside contour is less acute in the curve than the outside contour. For example, in FIG. 2, the outside contour includes a cuspidal portion while the inside contour includes a smooth curved portion. Hence, even when fluid such as air flows on an inner surface of the foam duct 200, resistance against the fluid is reduced and the flow efficiency (blow efficiency) of the fluid is improved.

The foam duct 200 includes a connecting portion 206 having a polygonal external contour at first and last ends in the longitudinal direction of the foam duct 200 to connect to another member 300 (FIG. 4). As FIGS. 4 and 5 show, the connecting portion 206 is a female-type connecting portion 206 to engage an inner surface side of the connecting portion 206 with an outer surface side of the member 300 for the connection therebetween. The opening of the connecting portion 206 has a rectangular contour and includes the bent portion 207 described above. The bent portion 207 includes the high-foam wall portion 204 having a higher expansion ratio than the other wall portions such that the bent portion 207 is higher in the heat insulating property and the shock absorbing property than the other wall portions. Hence, condensation is prevented in the bent portion 207. Further, it is possible to mitigate the shock taking place when the foam duct 200 falls on, for example, a floor or collides with another member.

The connecting portion 206 includes the bent portion 207 including the high-foam wall portion 204. This makes it possible to produce the bent portion 207 as a soft portion. Hence it is easy to insert the member 300 into the connecting portion 206 as shown in FIG. 4. When the member 300 is inserted as shown in FIG. 5 into the connecting portion 206 in the state of FIG. 3 and the outer surface side of the member 300 makes contact with the high-foam wall portion 204, the high-foam wall portion 204 deforms along the outer surface contour of the member 300, to stably hold the member 300. As a result, it is possible to prevent the event in which the foam duct 200 is easily removed from the member 300.

<Foam Duct 200 Molding Method Example>

Figure 6:
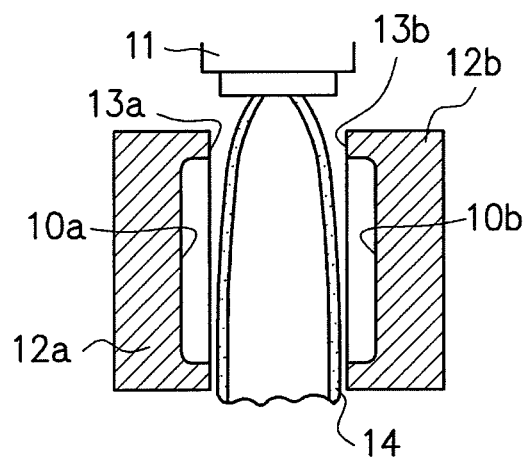
FIG. 6 is a first diagram showing an example of the molding method of the foam duct 200 in the first embodiment.
Figure 7:
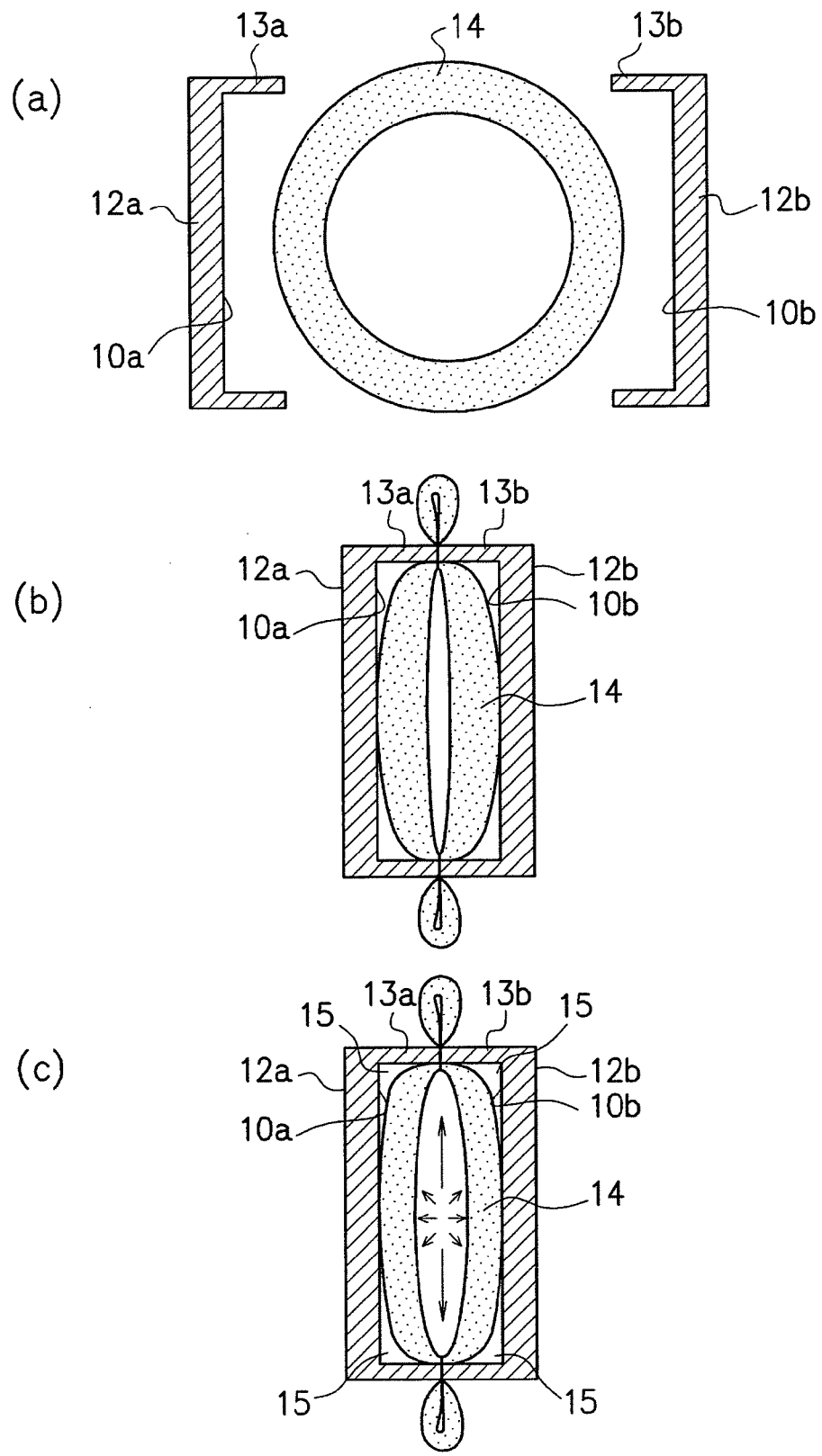
FIG. 7 is a second diagram showing an example of the molding method of the foam duct 200 in the first embodiment.
Figure 8:
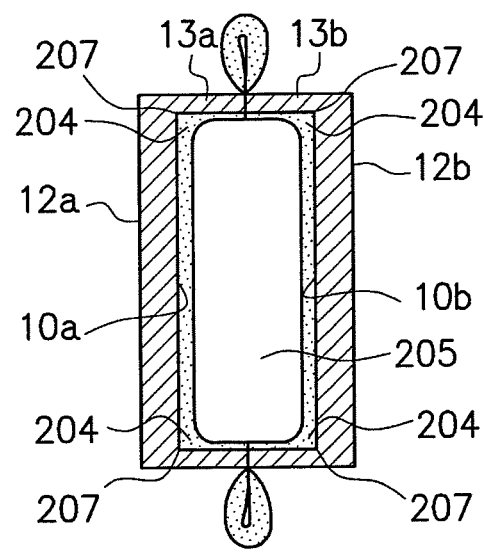
FIG. 8 is a third diagram showing an example of the molding method of the foam duct 200 in the first embodiment.
Figure 8:
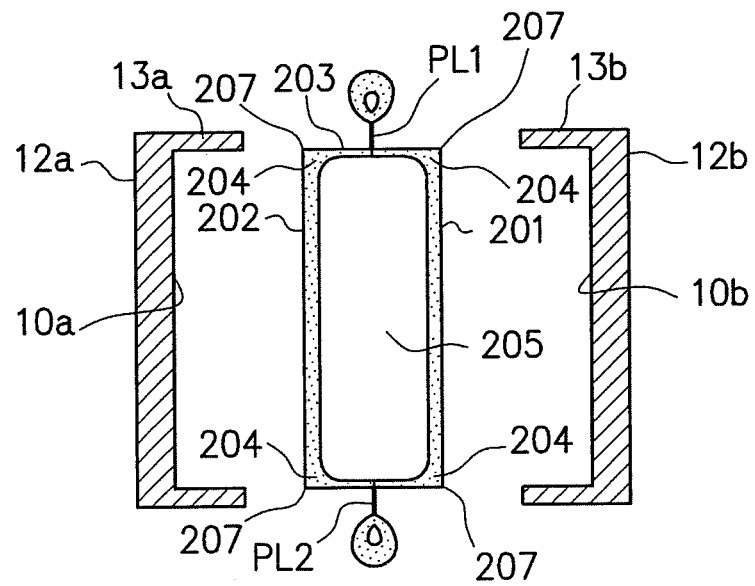

Next, referring to FIGS. 6 to 8, description will be given of an example of the molding method of molding the foam duct 200 of the present embodying mode. FIG. 6 shows a state in which a cylindrical foam parison 14 is extruded from an annular die 11. FIGS. 7 and 8 show states of the foam parison 14 viewed from the annular die 11 of FIG. 6.

First, as FIG. 6 shows, a resin prepared by adding a foaming agent to resin including materials at a predetermined ratio to have MT ranging from 3 cN to 5 cN at 230° C. is melted and kneaded into foam resin. The foam resin is extruded from the annular die 11 of an extruding machine to form a cylindrical foam parison 14. The foam parison 14 is placed between split metallic mold blocks 12*a* and 12*b*. As a result, it is possible to arrange the foam parison 14 between the split metallic mold blocks 12*a* and 12*b* as shown in FIGS. 6 and 7(*a*).

Thereafter, as FIG. 7(*b*) shows, the mold blocks 12*a* and 12*b* are driven to the clamping state and the foam parison 14 is clamped between the mold blocks 12*a* and 12*b*. Both ends of the foam parison 14 are nipped by pinch-off portions 13*a* and 13*b*, to thereby accommodate the foam parison 14 in a space between the cavities 10 and 10*b* of the mold blocks 12*a* and 12*b*.

Next, in the clamping state of the mold blocks 12*a* and 12*b*, a blow-in needle and a blow-out needle are inserted in the foam parison 14. Compressed gas such as air is blown from the blow-in needle into the foam parison 14. The air passes through the inside of the foam parison 14 and is blown out via the blow-out needle, to thereby conduct the blow molding at a predetermined blow pressure. Resultantly, as FIG. 7(*c*) shows, the foam parison 14 is pushed against wall surface sides of the cavities 10*a* and 10*b* to be extended toward sides of the cavities 10*a* and 10*b*.

When the blow molding is carried out at a predetermined blow pressure, it is possible to dispose a heat regulating unit to heat the compressed gas, which is supplied from the blow-in needle into the foam parison 14, to a predetermined temperature. Since the compressed gas supplied into the foam parison 14 is at a predetermined temperature, the foaming agent contained in the foam parison 14 easily foams. The predetermined temperature is favorably set to a temperature suitable to make the foaming agent easily foam.

It is also possible to conduct the molding without disposing the heat regulating unit. That is, the compressed gas supplied into the foam parison 14 is at a room temperature. Since it is not required to dispose the heat regulating unit to adjust the temperature of the compressed gas, the foam duct 200 can be molded at a low cost. Since the foam duct 200 is cooled after the blow molding and the blow molding is conducted at a room temperature, the period of time required to cool the foam duct 200 after the blow molding is reduced. However, when the blow molding is conducted at the predetermined temperature, it is required, in order to form the high-foam wall portion 204 in the bent portion 207 in a process later, to keep a gap 15 remained between the foam parison 14 and the cavities 10a and 10b.

As FIG. 7(c) shows, after the blow molding is performed at a predetermined blow pressure, a suction process is conducted for the cavities 10a and 10 of the mold blocks 12a and 12b, to extend the foam parison according to the contours of the cavities 10a and 10b as shown in FIG. 8(a).

In the molding method of the present embodying mode, by using a foam resin prepared by adding a foaming agent to resin including materials at a predetermined ratio to have MT ranging from 3 cN to 5 cN at 230° C., the blow molding is carried out at a predetermined blow pressure, to once extend the foam parison 14 toward the sides of the cavities 10a and 10b. Thereafter, the suction process is conducted for the cavities 10a and 10b, to extend the foam parison 14 according to the contours of the cavities 10a and 10b. As a result, the high-foam wall portion 204 is obtained in the bent portion 207 formed by extending the foam parison 14.

Next, compressed gas such as air is supplied from the blow-in needle into the foam parison 14. The air passes through the foam parison 14 to be exhausted from the blow-out needle, to cool the foam duct 200 at a predetermined blow pressure.

When cooling the foam duct 200, the compressed gas supplied from the blow-in needle into the foam parison 14 is set to a temperature ranging from 10° C. to 30° C., preferably to a room temperature, e.g., 23° C. By setting the compressed gas to a room temperature, it is not required to dispose the heat regulating unit to adjust the temperature of the compressed gas; hence, the foam duct 200 can be molded at a low cost. Further, when the heat regulating unit is disposed to set the compressed gas to a temperature lower than the room temperature, the period of time required to cool the foam duct 200 is reduced. The cooling period of time favorably ranges from 30 seconds to 80 seconds although depending on the temperature of the compressed gas.

After the foam duct 200 including high-foam wall sections 204 in the bent portions 207 is molded, the mold blocks 12a and 12b are opened as shown in FIG. 8(b) to take out the foam duct 200, and then undesired portions such as burrs are removed. Resultantly, the foam duct 200 shown in FIG. 1 is obtained.

<Operation and Effect of Foam Duct 200 of Present Embodying Mode>

As above, in the foam duct 200 of the present embodying mode, the cylindrical foam parison 14, which is molded by adding a foaming agent to resin including materials at a predetermined ratio to have MT ranging from 3 cN to 5 cN at 230° C., is arranged between the mold blocks 12a and 12b as shown in FIG. 7(a). The mold blocks 12a and 12b are driven into the clamping state as shown in FIG. 7(b). The blow-in and blow-out needles are inserted into the foam parison 14 to carry out the blow molding at a predetermined blow pressure, to thereby form a gap 15 between the foam parison 14 and the cavities 10a and 10b as shown in FIG. 7(c). Next, the suction process is conducted for the cavities 10a and 10b, to extend the foam parison 14 into the contours of the cavities 10a and 10b as shown in FIG. 8(a), to form the high-foam wall portion 204 in the bent portion 207. This results in the foam duct 200 in which the high-foam wall portion 204 is formed in the bent portion 207.

As FIG. 2 shows, since the foam duct 200 of the present embodying mode includes the bent portion 207 including the high-foam wall portion 204, it is possible that the bent portion 207 is higher in the heat insulating property and the shock absorbing property than the other wall portions. As a result, condensation is prevented in the bent portion 207. The bent portion 207 is easily broken when the foam duct 200 falls on, for example, a floor or collides with another member. However, since the bent portion 207 includes the high-foam wall portion 204 to provide the shock absorbing property, it is possible to mitigate the shock taking place when the foam duct 200 falls on, for example, a floor or collides with another member. In the high-foam wall portion 204, the inside contour is less acute in the curve than the outside contour. Hence, even when fluid flows on an inner surface of the foam duct 200, resistance against the fluid is reduced and the flow efficiency (blow efficiency) of the fluid is improved.

Since the connecting portion 206 also includes the bent portion 207 including the high-foam wall portion 204, it is possible to produce the bent portion 207 as a soft portion. Hence, it is easy to insert the member 300 into the connecting portion 206 as shown in FIG. 4. When the member 300 is inserted as shown in FIG. 5 into the connecting portion 206 in the state of FIG. 3 and the outer surface side of the member 300 makes contact with the high-foam wall portion 204, the high-foam wall portion 204 deforms along the outer surface contour of the member 300, to stably hold the member 300. As a result, it is possible to prevent the event in which the foam duct 200 is easily removed from the member 300.

In the foam duct 200 of the configuration example, the member 300 is inserted in the inner surface side of the connecting portion 206 to connect the outer surface of the member 300 to the inner surface of the connecting portion 206 as shown in FIGS. 4 and 5. However, it is also possible that a packing member 400 such as foam urethane is pasted around the outer circumferential surface of the member 300, and the member 300 around which the packing member 400 is pasted is inserted in the inner surface side of the cylindrical portion 206 for the connection therebetween.

(Second Embodiment)

Next, description will be given of a second embodiment.

In the foam duct 200 of the first embodiment, the bent portion 207 includes the high-foam wall portion 204 having a larger bubble diameter than the other wall portions as shown in FIG. 2.

Figure 9:
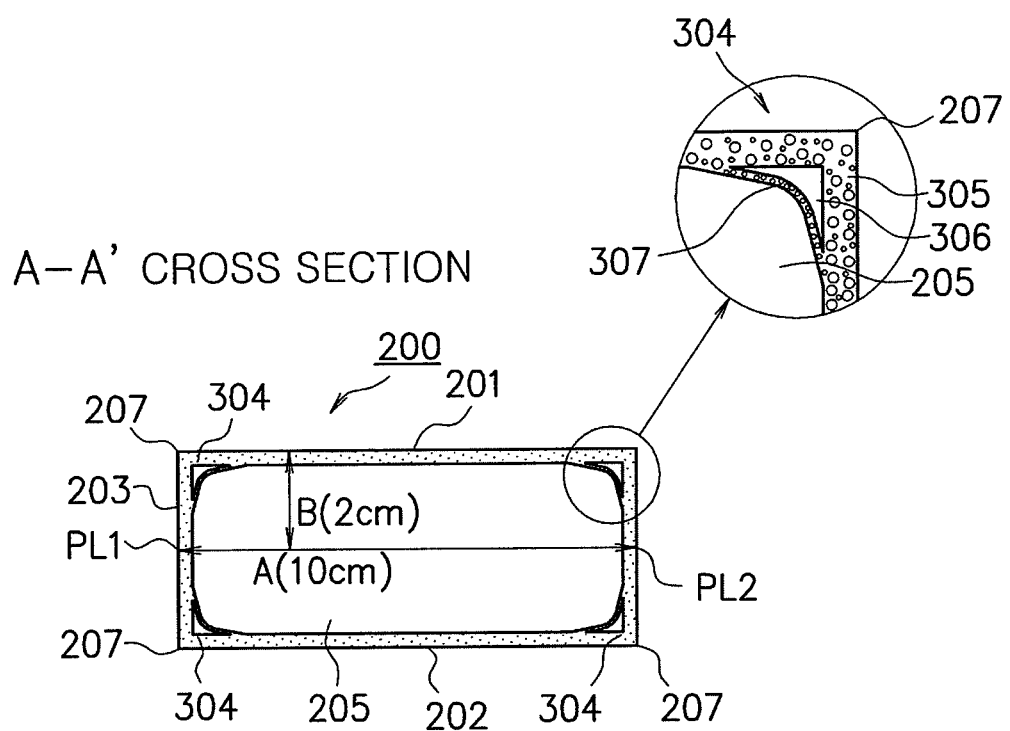
FIG. 9 is a diagram showing a configuration example of a foam duct 200 in a second embodiment.

In the second embodiment, as FIG. 9 shows, the bent portion 207 of the foam duct 200 includes the high-form wall portion 304 including a plurality of wall portions 305 and 307. Between the wall portions 305 and 307, there exists a hollow portion 306. The hollow portion 306 shown in FIG. 9 is formed, for example, when a wall (FIG. 2) between bubbles breaks during the molding and the bubbles are combined with each other, to thereby form a hollow portion. Also, when the foam resin is split into two portions during the molding, a hollow portion is formed between the two portions of the foam resin. The split two portions configure an outer wall portion 305 and an inner wall portion 307.

Assuming the hollow portion 306 as a bubble having a large bubble diameter, the bent portion 207 of the foam duct 200 includes as the whole the high-foam wall portion 304 including the bubble having a large bubble diameter. Hence, as in the first embodiment, it is possible to provide the bent portion 207 with the heat insulating property and the shock absorbing property also in the second embodiment. Referring now to FIGS. 9 to 12, description will be given in detail of the second embodiment.

<Configuration Example of Foam Duct 200>

Figure 10:
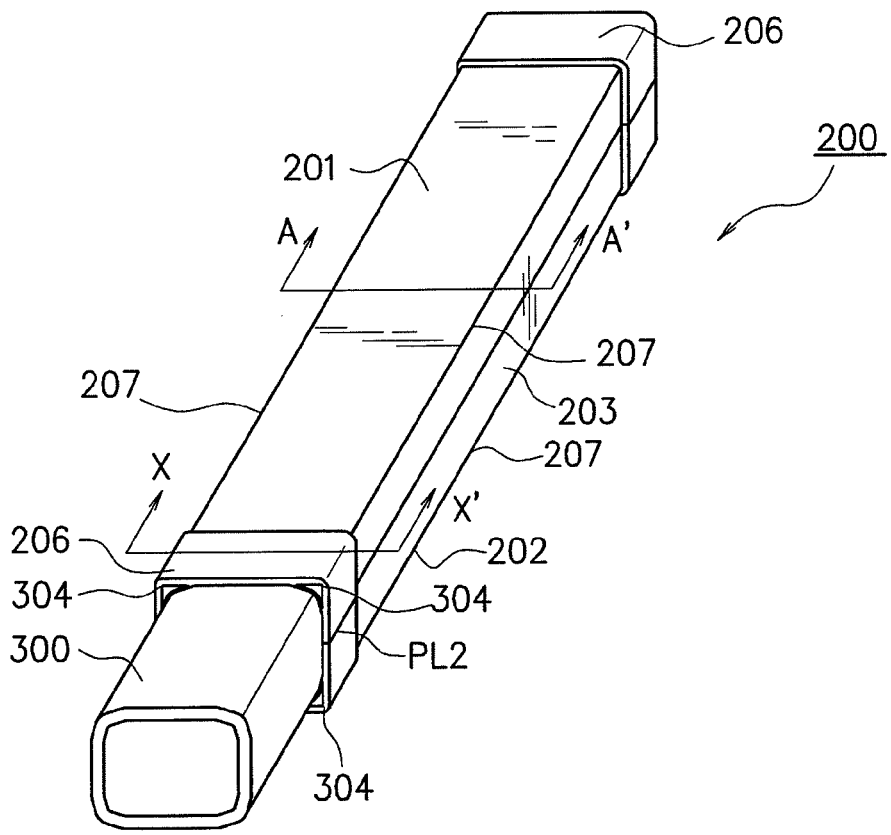
FIG. 10 is a diagram showing a state in which another member 300 is connected to the connecting portion 206 of the foam duct 200.
Figure 11:
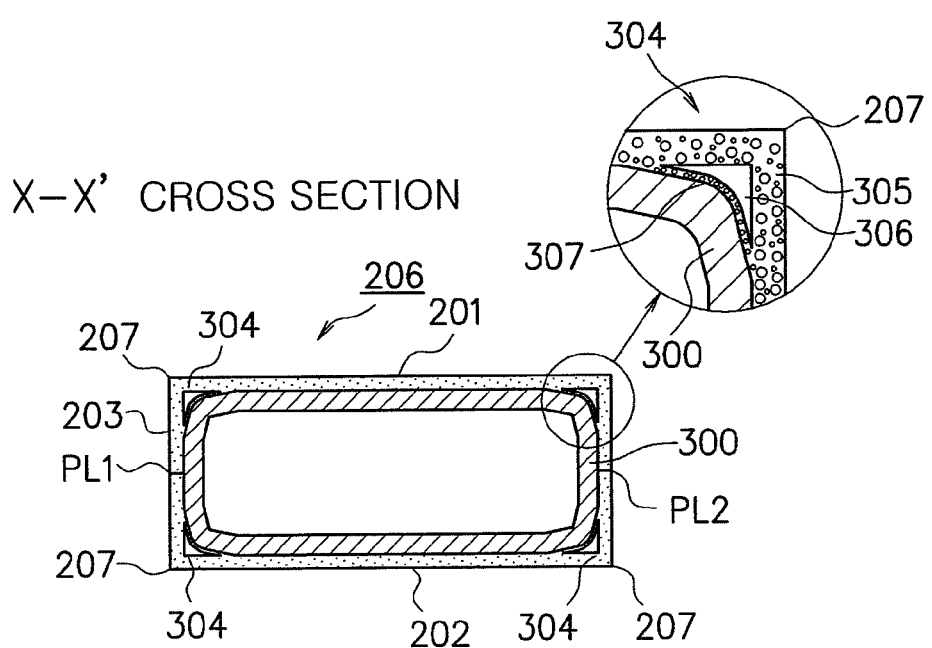
FIG. 11 is a first diagram showing an example of an X-X' cross-sectional configuration perpendicular to the hollow extending direction of the connecting portion 206 shown in FIG. 10.

Referring to FIGS. 9 to 11, description will be given of a configuration example of the foam duct 200 of the present embodying mode. The foam duct 200 of the second embodiment differs from that of the first embodiment only in the cross-sectional contour of the foam duct 200 as described above. The foam duct 200 of the present embodying mode is substantially equal in the outer contour in the appearance of the foam duct 200 shown in FIG. 1 and is hence not shown. FIG. 9 is an example of an A-A' cross-sectional configuration perpendicular to the hollow extending direction of the foam duct 200 shown in FIG. 10. FIG. 10 shows a state in which another member 300 is connected to the connecting portion 206 of the foam duct 200. FIG. 11 shows an example of an X-X' cross-sectional configuration perpendicular to the hollow extending direction of the connecting portion 206 shown in FIG. 10.

As FIG. 9 shows, the foam duct 200 includes the bent portion 207 including the high-form wall portion 304 in which the hollow portion 306 exists. The high-form wall portion 304 includes one hollow portion 306, the outer wall portion 305, and the inner wall portion 307. Although FIG. 9 shows a configuration example of the high-form wall portion 304 including one hollow portion 306 and two wall portions 305 and 307, the numbers of the hollow portions and the wall portions are not particularly limited, but the configuration may include a desired number of each of the hollow and wall portions. The hollow portion 306 shown in FIG. 9 is formed, for example, when a wall between bubbles (FIG. 2) breaks during the molding and the bubbles are combined with each other, to form a hollow portion. Also, when the foam resin is split into two portions during the molding, a hollow portion is formed between the two portions. Width of the hollow portion 306 is about 2.0 mm. However, the width of the hollow portion 306 indicates the longest portion between the wall portions 305 and 307.

In the cross-sectional contour perpendicular to the hollow extending direction of the foam duct 200 shown in FIG. 9, wall thickness takes the maximum value in the bent portion 207 including the high-form wall portion 304. The bent portion 207 including the high-form wall portion 304 is a portion most apart from a line connecting the parting lines PL1 and PL2 to each other. However, in the present embodying mode, by regarding the hollow portion 306 of the high-form wall portion 304 as a bubble, the thickness from the outer wall portion 305 to the inner wall portion 307 is assumed as the thickness of the high-form wall portion 304.

The foam resin for the foam duct 200 includes a foam resin prepared by adding a foaming agent to resin including materials at a predetermined ratio to have MT ranging from 1 cN to less than 3 cN at 230° C. Such resin including materials to have MT ranging from 1 cN to less than 3 cN at 230° C. includes materials at the ratio of, for example, BOLEARIS WB140: Sumitomo Chemical AW564:Sumitomo Chemical FX201=50:37.5:12.5. As the foaming agent, the forming agents used in the first embodiment are applicable. However, the forming agent is favorably less added in the present embodying mode than in the first embodiment (for example, half the amount of the forming agent employed in the first embodiment).

Since the foam duct 200 includes a foam resin prepared by adding a foaming agent to resin including materials at a predetermined ratio to have MT ranging from 1 cN to less than 3 cN at 230° C., it is possible to form the high-form wall portion 304 including the hollow portion 306 in the bent portion 207 as shown in FIG. 9.

Since the foam duct 200 includes the bent portion 207 including the high-foam wall portion 204, it is possible that the bent portion 207 is higher in the heat insulating property and the shock absorbing property than the other wall portions. As a result, condensation is prevented in the bent portion 207. The bent portion 207 is easily broken when the foam duct 200 falls on, for example, a floor or collides with another member. However, since the bent portion 207 includes the high-foam wall portion 304 to provide the shock absorbing property, it is possible to mitigate the shock taking place when the foam duct 200 falls on, for example, a floor or collides with another member. Further, the inside contour of the high-foam wall portion 304 is less acute in the curve than the outside contour. Hence, even when fluid flows on an inner surface of the foam duct 200, resistance against the fluid is reduced and the flow efficiency (blow efficiency) of the fluid is improved.

As FIG. 10 shows, the foam duct 200 includes a connecting portion 206 having a polygonal external contour at first and last ends in the longitudinal direction of the foam duct 200 to connect to another member 300. The connecting portion 206 includes the bent portion 207 described above. The bent portion 207 includes the high-foam wall portion 304 having a higher expansion ratio than the other wall portions such that the bent portion 207 is higher in the heat insulating property and the shock absorbing property than the other wall portions. Hence, condensation is prevented in the bent portion 207. Also, it is possible to mitigate the shock taking place when the foam duct 200 falls on, for example, a floor or collides with another member.

In the connecting portion 206, the bent portion 207 includes the high-foam wall portion 304. This makes it possible to produce the bent portion 207 as a soft portion. As a result, the member 300 is easily inserted into the connecting portion 206 as shown in FIG. 10. Further, when the member 300 is inserted as shown in FIG. 11 into the connecting portion 206 and the outer surface side of the member 300 makes contact with the inner wall portion 307 of the high-foam wall portion 304, the inner wall portion 307 deforms along the outer surface contour of the member 300, to stably hold the member 300. As a result, it is possible to prevent the event in which the foam duct 200 is easily removed from the member 300.

Figure 12:
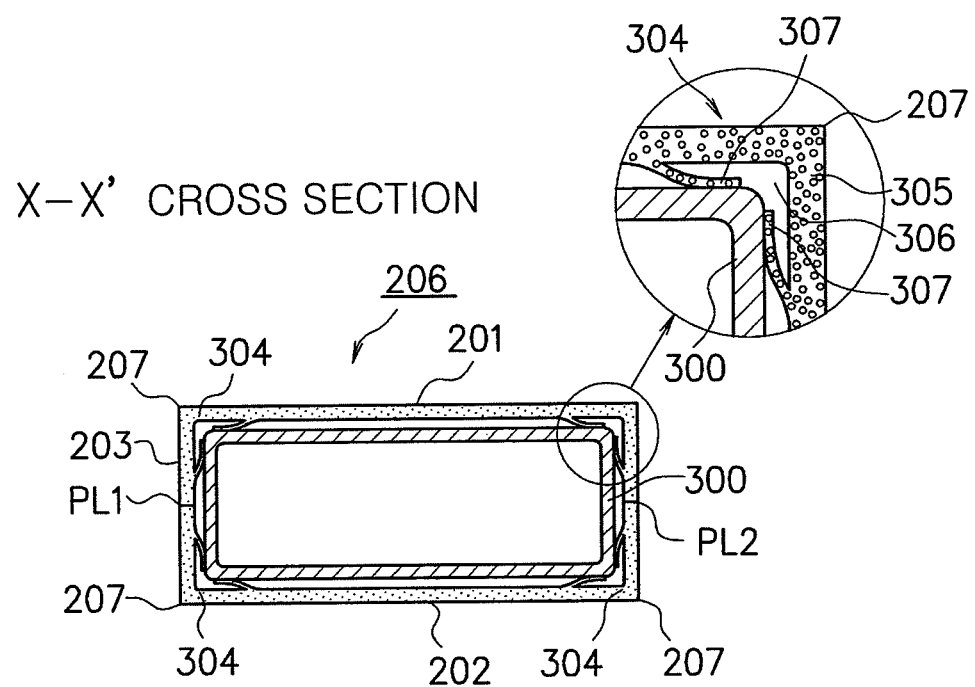
FIG. 12 is a second diagram showing an example of an X-X' cross-sectional configuration perpendicular to the hollow extending direction of the connecting portion 206 shown in FIG. 10.

The high-foam wall portion 304 includes a plurality of wall portions 305 and 307 with the hollow portion therebetween. Hence, for example, when part of the inner wall portion 307 is cut off such that the member 300 is inserted into the connecting portion 206 and the outer surface side of the member 300 makes contact with the inner wall portion 307 of the high-foam wall portion 304 as shown in FIG. 12, the inner wall portion 307 deforms along the outer surface contour of the member 300, to stably hold the member 300. As a result, it is possible to prevent the event in which the foam duct 200 is easily removed from the member 300.

<Foam Duct 200 Molding Method Example>

Figure 13:
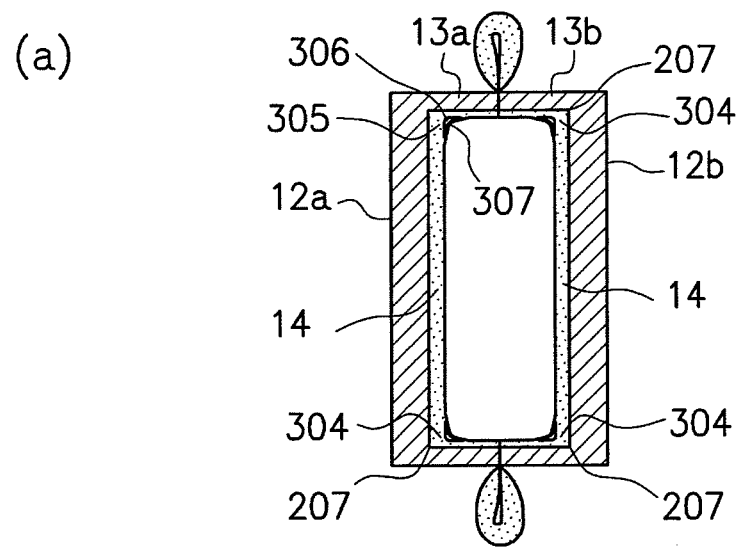
FIG. 13 is a diagram showing an example of the molding method of the foam duct 200 in the second embodiment.
Figure 13:
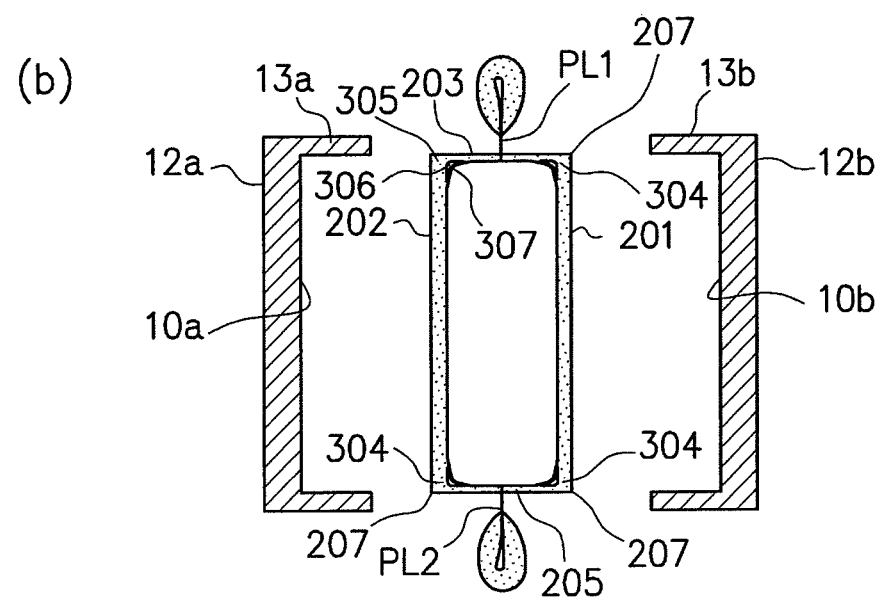

Referring now to FIGS. 6, 7, and 13, description will be given of an example of the molding method of molding the foam duct 200 of the present embodying mode.

In the first embodiment, the foam duct 200 is molded by use of a foam resin prepared by adding a foaming agent to resin including materials at a predetermined ratio to have MT ranging from 3 cN to 5 cN at 230° C. In the present embodying mode, the foam duct 200 is molded by use of a foam resin prepared by adding a foaming agent to resin including materials at a predetermined ratio to have MT ranging from 1 cN to less than 3 cN at 230° C. The molding method of the present embodying mode of is almost the same as for the first embodiment.

As FIG. 6 shows, a resin prepared by adding a foaming agent to resin including materials at a predetermined ratio to have MT ranging from 1 cN to less than 3 cN at 230° C. is melted and kneaded into foam resin. The foam resin is extruded from the annular die 11 of an extruding machine to form a cylindrical foam parison 14. The foam parison 14 is placed between split metallic mold blocks 12a and 12b as shown in FIGS. 6 and 7(a).

Next, as FIG. 7(b) shows, the mold blocks 12a and 12b are driven to the clamping state and the foam parison 14 is clamped between the mold blocks 12a and 12b. In the clamping state of the mold blocks 12a and 12b, a blow-in needle and a blow-out needle are inserted in the foam parison 14. Compressed gas is blown from the blow-in needle into the foam parison 14, to thereby conduct the blow molding at a predetermined blow pressure. Resultantly, as FIG. 7(c) shows, the foam parison 14 is pushed against wall surface sides of the cavities 10a and 10b to be extended toward the sides of the cavities 10a and 10b.

As FIG. 7(c) shows, after the blow molding is performed at a predetermined blow pressure, a suction process is conducted for the cavities 10a and 10 of the mold blocks 12a and 12b, to extend the foam parison 14 according to the contours of the cavities 10a and 10b as shown in FIG. 13(a). The foam duct 200 is molded by use of a foam resin prepared by adding a foaming agent to resin including materials at a predetermined ratio to have MT ranging from 1 cN to less than 3 cN at 230° C. Hence, as FIG. 13(a) shows, the foam parison 14 is split into two portions, and the hollow portion 306 is formed in a space between the two portions of the parison 14. The two foam portions provide the inner wall portion 307 and the outer wall portion 305. As a result, the high-foam wall portion 304 including the hollow portion 306 is formed in the bent portion 207. To split the foam parison 14 into a plurality of portions, it is desirable that the central portion of the foam parison 14 is hardened to a predetermined value or more in the blow molding process at a predetermined blow pressure as shown in FIG. 7(c). In this situation, as FIG. 13(a) shows, the foam prison 14 is easily split in a portion near the hardened central portion when the suction process is conducted for the cavities 10a and 10.

Next, compressed gas such as air is supplied from the blow-in needle into the foam parison 14. The air passes through the foam parison 14 to be exhausted from the blow-out needle, to cool the foam duct 200 at a predetermined blow pressure.

As a result, there is molded the foam duct 200 in which the high-foam wall portion 304 is formed in the bent portion 207. After the foam duct 200 is molded, the mold blocks 12a and 12b are opened as shown in FIG. 13(b) to take out the foam duct 200, and then undesired portions such as burrs are removed.

<Operation and Effect of Foam Duct 200 of Present Embodying Mode>

As above, in the present embodying mode, the foam duct 200 is molded by use of a cylindrical foam resin molded using resin prepared by adding a foaming agent to resin including materials at a predetermined ratio to have MT ranging from 1 cN to less than 3 cN at 230° C. almost in the same way as for the first embodiment. This makes it possible to mold the foam duct 200 in which the high-foam wall portion 304 including the hollow portion 306 is formed in the bent portion 207. Hence, as in the foam duct 200 of the first embodiment, it is possible to provide the bent portion 207 with a heat insulating property and a shock absorbing property.

(Third Embodiment)

Next, description will be given of a third embodiment.

In the description of the foam ducts 200 of the first and second embodiments, the connecting portion 206 has no branch as shown in FIG. 1.

Figure 14:
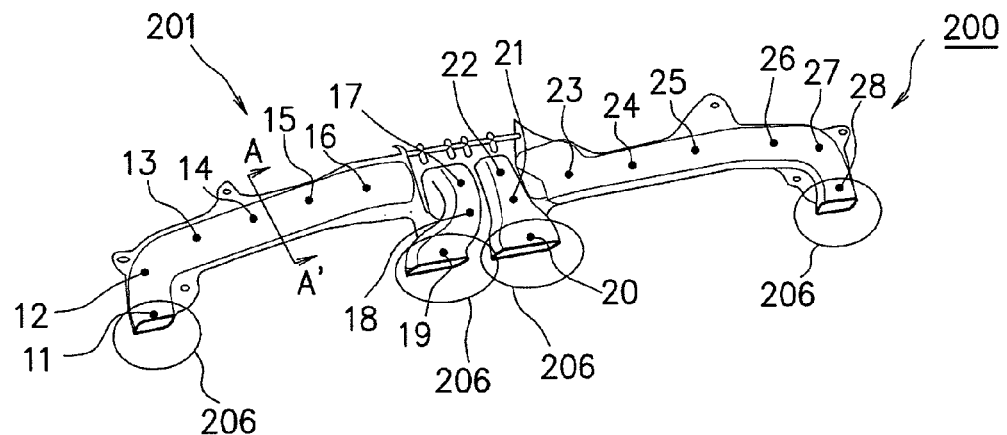
FIG. 14 is a diagram showing a configuration example of the foam duct 200 in a third embodiment.
Figure 14:
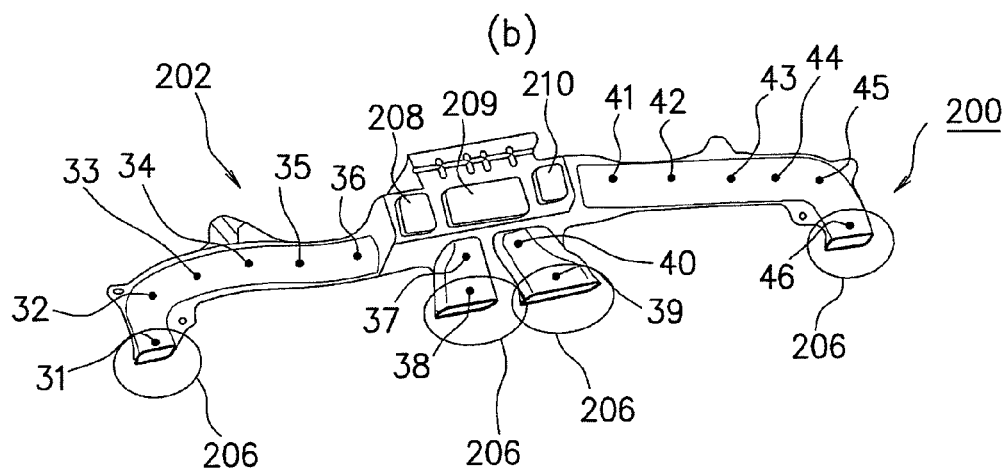

In the description of the third embodiment, the connecting portion 206 includes two or more branches as shown in FIG. 14. Also in the situation of the configuration example shown in FIG. 14, it is possible, in the bent portion 207 of the foam duct 200, to form the high-form wall portion 204 shown in FIG. 2 and the high-form wall portion 304 shown in FIG. 9. Hence, it is possible to provide the bent portion 207 with a heat insulating property and a shock absorbing property. Next, referring to FIGS. 14 to 17, description will be given of the foam duct 200 of the present embodying mode. In this connection, an "inpane" duct will be described as an example of the foam duct 200.

<Configuration Example of Foam Duct 200>

Figure 15:
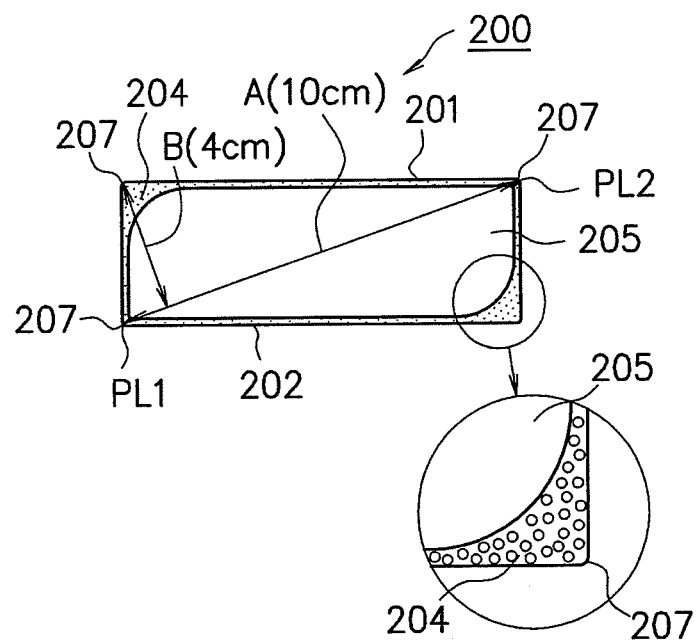
FIG. 15 is a diagram showing an example of an A-A' cross-sectional configuration perpendicular to the hollow extending direction of the foam duct 200 shown in FIG. 14.

Referring to FIGS. 14 and 15, description will be given of a configuration example of the foam duct 200 of the present embodying mode. FIG. 14 shows a configuration example of the foam duct 200. FIG. 14(a) shows the side of a first wall portion 201 of the foam duct 200. FIG. 14(b) shows the side of a second wall portion 202 of the foam duct 200. FIG. 15 shows an example of an A-A' cross-sectional configuration perpendicular to the hollow extending direction of the foam duct 200 shown in FIG. 14(a).

The foam duct 200 is molded by blowing foam resin with an expansion ratio of 2.0 or more in independent bubble structure including a plurality of foamed cells.

The foam duct 200 of the present embodying mode includes a first wall portion 201 and a second wall portion 202 which are welded onto each other via parting lines PL1 and PL2. The foam duct 200 includes a hollow portion 205 in a space between the first and second wall portions 201 and 202 such that fluid such as air flows through the hollow portion 205.

The foam duct 200 includes the bent portions 207 as shown in FIG. 15 and the bent portions 207 include high-foam wall portions 204. The bent portions 207 are portions to be bent in the foam duct 200. The high-foam wall portions 204 have a larger bubble diameter than other wall portions and have a higher expansion ratio than other wall portions. The expansion ratio of the high-foam wall portions 204 is obtained by multiplying that of the other portions by a value ranging from about 0.3 to about 0.5.

The first and second wall portions 201 and 202 of the foam duct 200 have a mean thickness ranging from 2.0 mm to 3.0 mm.

The mean thickness is mean thickness calculated by use of thickness values measured at an equal interval of about 100 mm in the hollow extending direction of the foam duct 200. The hollow extending direction is a direction in which the hollow portion 205 extends in the foam duct 200 and is the direction in which fluid flows. The mean thickness on the side of the first wall portion 201 of the foam duct 200 is mean thickness calculated by use of thickness values measured at 18 positions, i.e., positions 11 to 19 and 20 to 28 on the side of the first wall portion 201 of the foam duct 200 shown in FIG. 14(a). The mean thickness on the side of the second wall portion 202 is mean thickness calculated by use of thickness values measured at 16 positions, i.e., positions 31 to 38 and 39 to 46 on the side of the second wall portion 202 of the foam duct 200 shown in FIG. 14(b). The mean thickness of the overall foam duct 200 is mean thickness calculated by use of the mean thickness on the side of the first wall portion 201 and the mean thickness on the side of the second wall portion 202.

In the cross-sectional contour perpendicular to the hollow extending direction of the foam duct 200 shown in FIG. 15, wall thickness takes the maximum value in the bent portion 207 including the high-form wall portion 204. The bent portion 207 including the high-form wall portion 204 is a portion most apart from a line connecting the parting lines PL1 and PL2 to each other. The blow ratio of the foam duct 200 shown in FIG. 15 is a ratio (B/A), taken in the crosssection perpendicular to the hollow extending direction, between length A of a straight line connecting parting lines PL1 and PL2 to each other and distance B from straight line A to an outer surface of the wall portion most apart therefrom as shown in FIG. 15. The ratio (B/A) is 0.4 in FIG. 15.

The foam resin for the foam duct 200 includes a foam resin prepared by adding a foaming agent to resin including materials at a predetermined ratio to have MT ranging from 3 cN to 5 cN at 230° C. Since the foam duct 200 is molded by use of a foam resin prepared by adding a foaming agent to resin including materials to have MT ranging from 3 cN to 5 cN at 230° C., it is possible to form, in the bent portion 207, the high-foam wall portion 204 having a high expansion ratio as shown in FIG. 15.

Since the foam duct 200 includes the bent portion 207 including the high-foam wall portion 204, it is possible that the bent portion 207 is higher in the heat insulating property and the shock absorbing property than the other wall portions. As a result, condensation is prevented in the bent portion 207. The bent portion 207 likely receives shock when the foam duct 200 falls on, for example, a floor or collides with another member. However, since the bent portion 207 includes the high-foam wall portion 204 to provide the shock absorbing property, it is possible to mitigate the shock taking place when the foam duct 200 falls on, for example, a floor or collides with another member. Further, in the high-foam wall portion 204, the inside contour is less acute in the curve than the outside contour. Hence, even when fluid flows on an inner surface of the foam duct 200, resistance against the fluid is reduced and the flow efficiency (blow efficiency) of the fluid is improved.

The foam duct 200 includes a connecting portion 206 to connect to another member 300. The connecting portion 206 includes two or more branches. The connecting portion 206 is a female-type connecting portion 206 such that an inner surface side of the connecting portion 206 engages with an outer surface side of the member 300 for the connection therebetween. The opening of the connecting portion 206 has a rectangular contour and there is disposed the bent portion 207 including the high-foam wall portion 204 shown in FIG. 15. In the connecting portion 206, this makes it possible to produce the bent portion 207 as a soft portion. Hence, it is easy to insert the member 300 into the connecting portion 206. In the connecting portion 206, when the outer surface side of the member 300 makes contact with the high-foam wall portion 204, the high-foam wall portion 204 deforms along the outer surface contour of the member 300, to stably hold the member 300. As a result, it is possible to prevent the event in which the foam duct 200 is easily removed from the member 300.

<Foam Duct 200 Molding Method Example>

Figure 16:
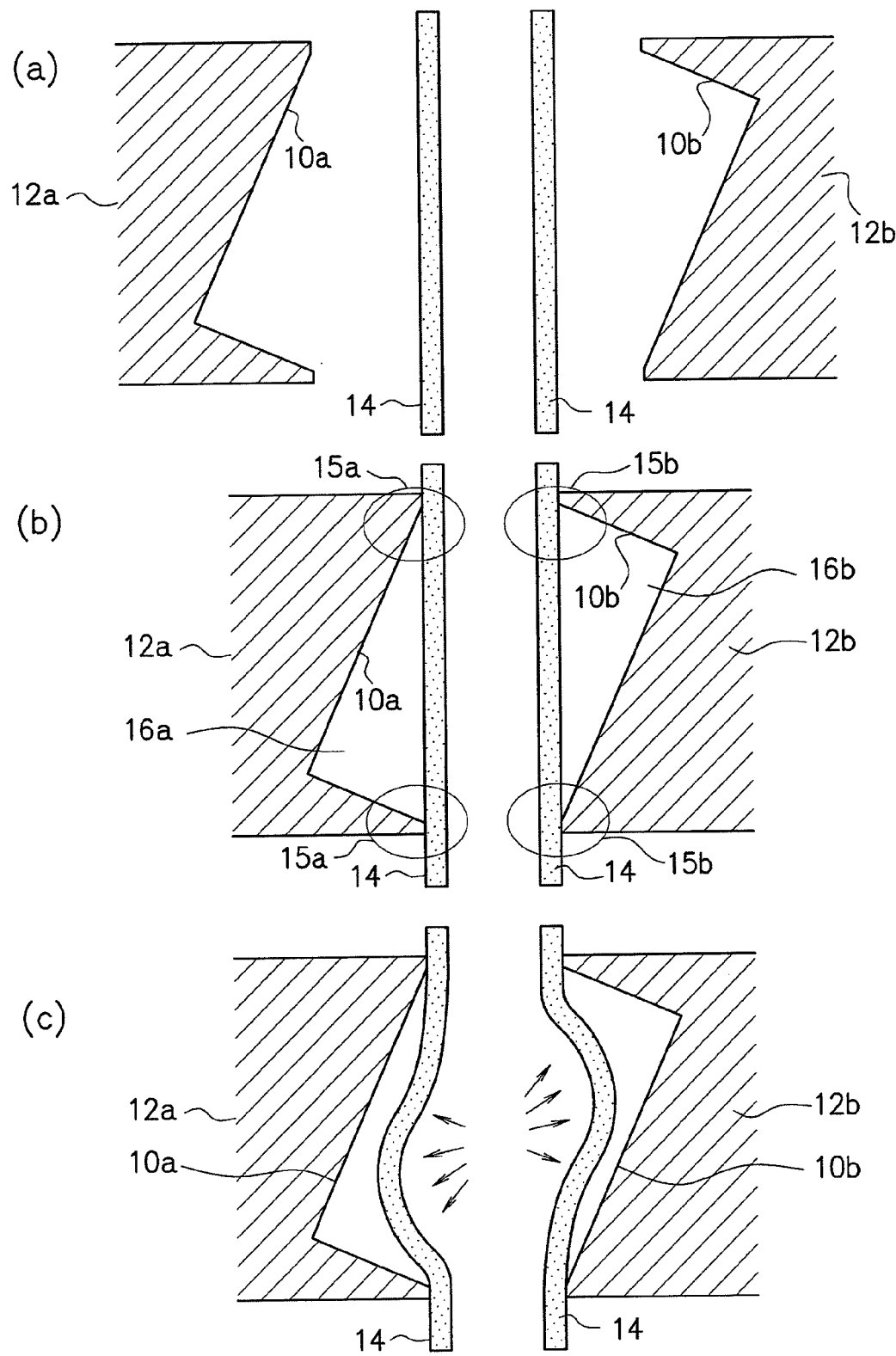
FIG. 16 is a first diagram showing an example of the molding method of the foam duct 200 in the third embodiment.
Figure 17:
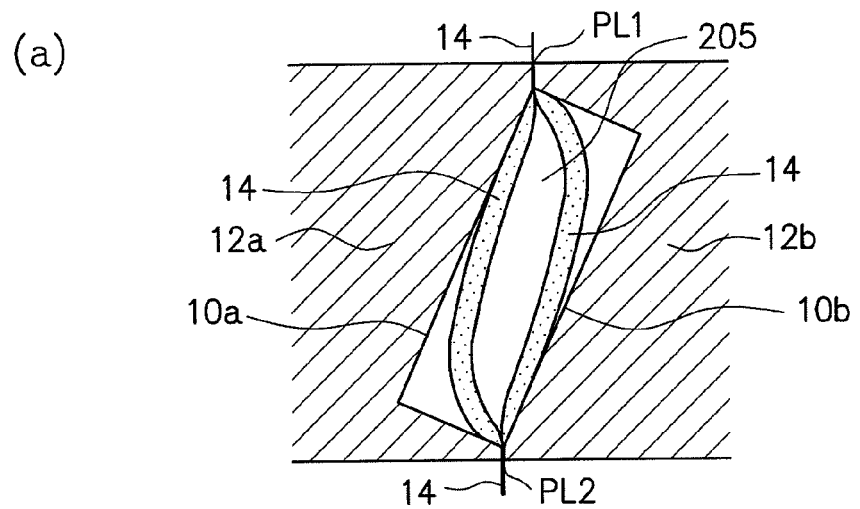
FIG. 17 is a second diagram showing an example of the molding method of the foam duct 200 in the third embodiment.
Figure 17:
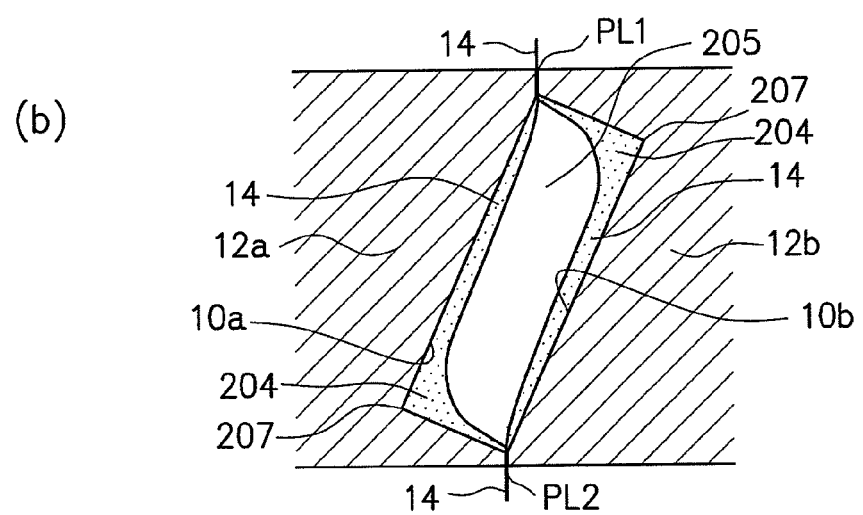
Figure 17:
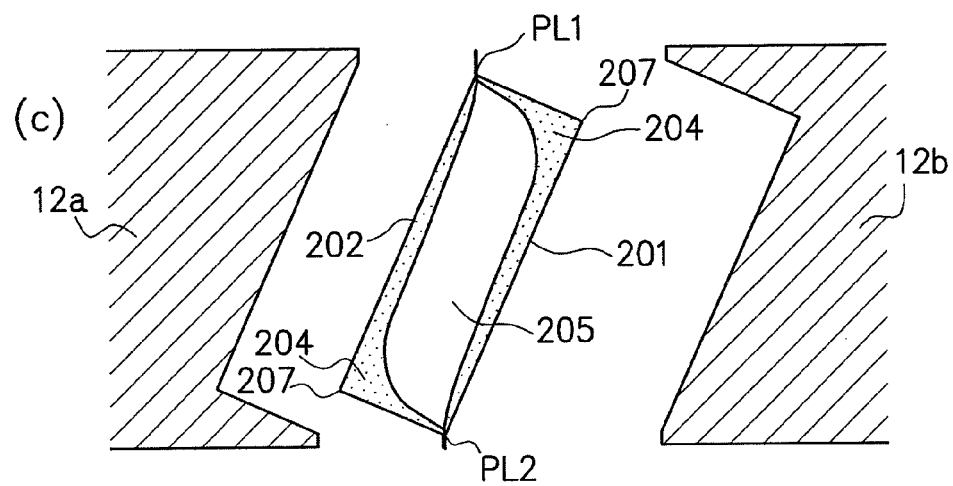

Next, referring to FIGS. 6, 16, and 17, description will be given of an example of the molding method of molding the foam duct 200 of the present embodying mode.

As FIG. 6 shows, a resin prepared by adding a foaming agent to resin including materials at a predetermined ratio to have MT ranging from 3 cN to 5 cN at 230° C. is melted and kneaded into foam resin. The foam resin is extruded from the annular die 11 of an extruding machine to form a cylindrical foam parison 14. The foam parison 14 is placed between split metallic mold blocks 12a and 12b. As a result, it is possible to arrange the foam parison 14 between the split metallic mold blocks 12a and 12b as shown in FIGS. 6 and 16(a).

The mold blocks 12a and 12b are then moved to the side of the foam parison 14 as shown in FIG. 16(b) such that the cavities 10a and 10b of the mold blocks 12a and 12b make contact with the foam parison 14, to form sealed spaces 16a and 16b by the foam parison 14 and the cavities 10a and 10b.

Next, the suction process is performed via the mold blocks 12a and 12b for the sealed spaces 16a and 16b such that the foam parison 14 is pushed against the cavities 10a and 10b, to draw the foam parison 14 toward the sides of the cavities 10a and 10b as shown in FIG. 16(c). In a space formed by the mold blocks 12a and 12b, a vacuum suction chamber, not shown, is disposed to be connected via suction holes to the cavities 10a and 10b. By conducting the suction process via the suction holes for the vacuum suction chamber, the foam parison 14 is adsorbed toward the cavities 10a and 10b, to thereby draw the foam parison 14 toward the sides of the cavities 10a and 10b.

As FIG. 17(a) shows, the mold blocks 12a and 12b are driven to the clamping state and the foam parison 14 is clamped between the mold blocks 12a and 12b. As a result, both ends of the foam parison 14 are nipped by the mold blocks 12a and 12b, to accommodate the foam parison 14 in a space between the cavities 10 and 10b of the mold blocks 12a and 12b. Further, peripheral portions of the form parison 14 are welded onto each other, to thereby form the parting lines PL1 and PL2.

In the clamping state of the mold blocks 12a and 12b, a suction process is conducted via the mold blocks 12a and 12b for the sealed spaces 16a and 16b, to shape the foam parison 14 in a contour according to the cavities 10a and 10b as shown in FIG. 17(b).

In the molding method of the present embodying mode, the foam parison 14 is molded by using a foam resin prepared by adding a foaming agent to resin including materials at a predetermined ratio to have MT ranging from 3 cN to 5 cN at 230° C. The suction process is conducted via the mold blocks 12a and 12b for the sealed spaces 16a and 16b, to once draw the foam parison 14 toward the sides of the cavities 10a and 10b. Thereafter, by again conducting the suction process for the cavities 10a and 10b of the mold blocks 12a and 12b, the foam parison 14 is extended into the contours of the cavities 10a and 10b. As a result, the high-foam wall portion 204 is obtained in the bent portion 207 formed by extending the foam parison 14.

After the foam duct 200 including high-foam wall sections 204 in the bent portions 207 is molded, the mold blocks 12a and 12b are opened as shown in FIG. 17(c) to take out the foam duct 200, and then undesired portions such as burrs are removed. As a result, the foam duct 200 shown in FIG. 14 is obtained.

<Operation and Effect of Foam Duct 200 of Present Embodying Mode>

In the foam duct 200 of the present embodying mode, the cylindrical foam parison 14, which is molded using resin obtained by adding a foaming agent to resin including materials at a predetermined ratio to have MT ranging from 3 cN to 5 cN at 230° C., is arranged between the mold blocks 12a and 12b as shown in FIG. 16(a). Thereafter, as FIG. 16(b) shows, the cavities 10a and 10b of the mold blocks 12a and 12b are brought into contact with the foam parison 14, to form the sealed spaces 16a and 16b by the foam parison 14 and the cavities 10a and 10b. Next, the suction process is conducted via the mold blocks 12a and 12b for the cavities 10a and 10b to push the foam parison 14 against the cavities 10a and 10b, to thereby draw the foam parison 14 toward the sides of the cavities 10a and 10b as shown in FIG. 16(c). Further, as FIG. 17(a) shows, the mold blocks 12a and 12b are driven to the clamping state. In the clamping state of the mold blocks 12a and 12b, the suction process is conducted via the mold blocks 12a and 12b for the sealed spaces 16a and 16b, to shape the foam parison 14 in the contour according to the cavities 10a and 10b as shown in FIG. 17(b). It is hence possible to mold the foam duct 200 in which the high-foam wall portion 204 is formed in the bent portion 207. As a result, it is possible to provide the bent portion 207 with the heat insulating property and the shock absorbing property.

Figure 18:
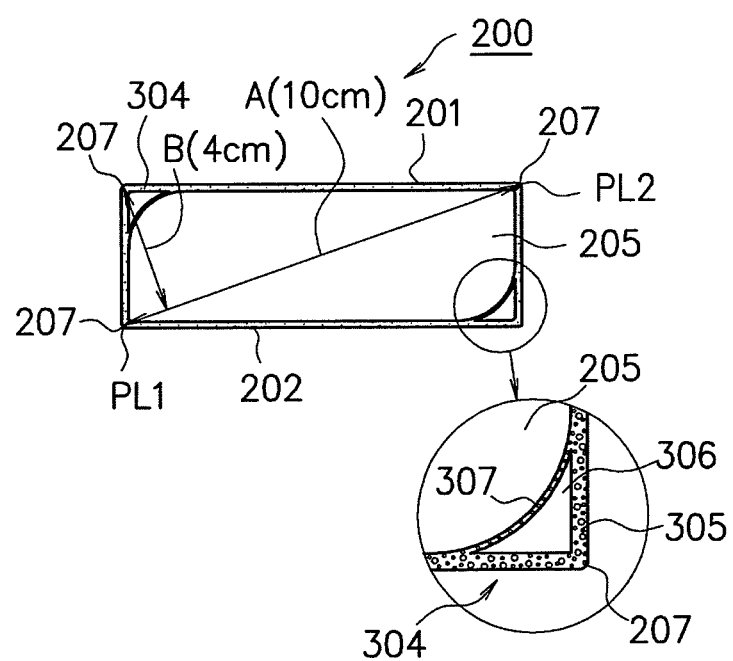
FIG. 18 is a diagram showing another configuration example of the foam duct 200 in the third embodiment.
Figure 19:
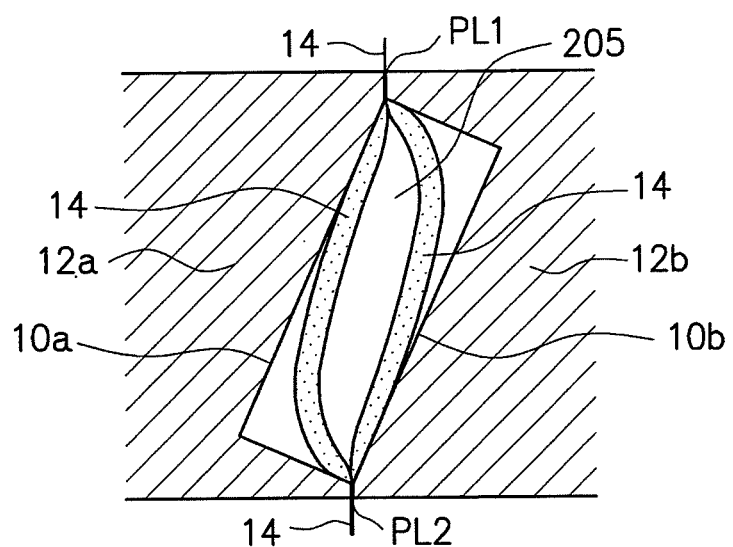
FIG. 19 is a diagram showing an example of the molding method of the foam duct 200 shown in FIG. 18.
Figure 19:
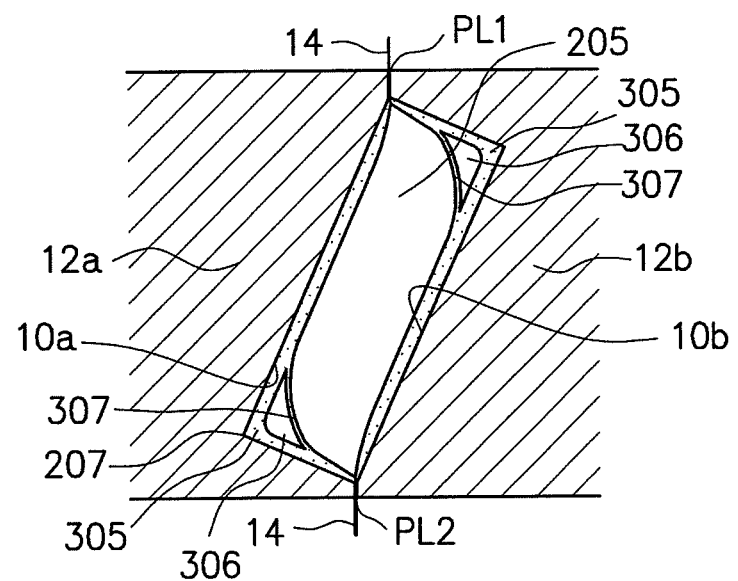

In the third embodiment, the foam duct 200 14 is molded by using a foam resin prepared by adding a foaming agent to resin including materials at a predetermined ratio to have MT ranging from 3 cN to 5 cN at 230° C., to form the high-form wall portion 204 having a large bubble diameter in the bent portion 207 as shown in FIG. 15. However, in the third embodiment, by molding the foam duct 200 by use of a foam resin prepared by adding a foaming agent to resin including materials at a predetermined ratio to have MT ranging from 1 cN to less than 3 cN at 230° C., it is possible to mold, in the bent portion 207, the high-form wall portion 304 including a plurality of wall portions 305 and 307 between which the hollow portion 306 exists as shown in FIG. 18. To form the high-form wall portion 304 of FIG. 18 in the molding method described above, the suction process is conducted, in the clamping state of the mold blocks 12a and 12b, via the mold blocks 12a and 12b for the sealed spaces 16a and 16b as shown in FIG. 19(a), to shape the foam parison 14 in the contour according to the cavities 10a and 10b as shown in FIG. 19(b). In this situation, the foam parison 14 is split into two portions, and the hollow portion 306 is formed in a space between the two portions of the parison 14. The two foam parisons provide the inner wall portion 307 and the outer wall portion 305. As a result, the high-foam wall portion 304 including the hollow portion 306 is formed in the bent portion 207.

The embodying modes described above are favorable embodying modes of the present invention. The present invention is not limited to these embodying modes, but various changes in form and details may be made therein without departing from the spirit and scope of the present invention as defined claims.

For example, in conjunction with the embodying modes, description has been given of an example in which the foam duct 200 includes the high-foam wall portions 204 and 304 in the bent portion 207. However, it is possible to mold the foam duct 200 by using two foam resin sheets (each having the contour of a sheet) in place of the cylindrical foam parison 14. When the foam resin sheets are employed, it is possible to adjust sheet thickness of each foam resin sheet. Hence, the thickness may differ between the first and second wall portions 201 and 202, and the contours of the high-foam wall portions 204 and 304 may also differ between the first and second wall portions 201 and 202. As a result, it is possible to freely change the contour of the hollow portion 205 of the foam duct 200.

What is claimed is:

1. A foam duct having a polygon shape and comprising foam resin, comprising a high-foam wall portion constituting a whole corner portion of the foam duct, and foam wall portions extending from the whole corner portion, the whole corner portion having a higher expansion ratio of 2 or more than the foam wall portions.

2. A foam duct in accordance with claim 1, the high-foam wall portion is a bent portion.

3. A foam duct in accordance with claim 1, the high-foam wall portion is a connecting portion.

4. A foam duct in accordance with claim 1, wherein the high-foam wall portion has a larger bubble diameter than the foam wall portions.

5. A foam duct in accordance with claim 1, wherein the high-foam wall portion constituting the whole corner portion includes an inside contour and an outside contour, the curve of the inside contour being less acute than the curve of the outside contour.

6. A foam duct comprising foam resin, comprising a high-foam wall portion constituting a corner portion of the foam duct, and foam wall portions extending from the corner portion, the corner portion having a higher expansion ratio of 2 or more than the foam wall portions,
   wherein the high-foam wall portion constituting the corner portion includes an inner wall and an outer wall, and a hollow portion between the inner wall and the outer wall.

\* \* \* \* \*